United States Patent
Miyao et al.

(10) Patent No.: US 8,025,822 B2
(45) Date of Patent: Sep. 27, 2011

(54) METHOD OF MANUFACTURING A MICROLENS SUBSTRATE, AN OPPOSED SUBSTRATE FOR A LIQUID CRYSTAL PANEL, A LIQUID CRYSTAL PANEL AND A PROJECTION TYPE DISPLAY APPARATUS

(75) Inventors: Nobuyuki Miyao, Shiojiri (JP); Mitsutoyo Tanaka, Chino (JP)

(73) Assignee: Seiko Epson Corporation, Tokyo (JP)

( * ) Notice: Subject to any disclaimer, the term of this patent is extended or adjusted under 35 U.S.C. 154(b) by 114 days.

(21) Appl. No.: 12/708,716

(22) Filed: Feb. 19, 2010

(65) Prior Publication Data

US 2010/0149442 A1   Jun. 17, 2010

Related U.S. Application Data

(63) Continuation of application No. 11/410,844, filed on Apr. 25, 2006, now abandoned.

(30) Foreign Application Priority Data

Apr. 26, 2005   (JP) .................................. 2005-128368
Mar. 7, 2006    (JP) .................................. 2006-061870

(51) Int. Cl.
*B29D 11/00* (2006.01)
(52) U.S. Cl. ..................................................... 264/1.7
(58) Field of Classification Search ............... 264/1.7; 369/275.1; 428/428, 429, 412
See application file for complete search history.

(56) References Cited

U.S. PATENT DOCUMENTS

| 5,276,538 | A  | * | 1/1994 | Monji et al. ..................... 349/95 |
| 6,555,236 | B1 | * | 4/2003 | Nakamura et al. ............. 428/447 |
| 2002/0021386 | A1 | * | 2/2002 | Yotsuya et al. .................. 349/95 |
| 2006/0217515 | A1 |   | 9/2006 | Getman et al. |

FOREIGN PATENT DOCUMENTS

| JP | 01189685 |   | 7/1989 |
| JP | 2001-092365 |   | 4/2001 |
| JP | 2003-177212 |   | 6/2003 |
| WO | WO 2006/012367 | * | 9/2006 |
| WO | WO 2006/102367 |   | 9/2006 |

* cited by examiner

*Primary Examiner* — Christina Johnson
*Assistant Examiner* — Larry Thrower

(57) ABSTRACT

A method of manufacturing a microlens substrate 10 is provided. The microlens substrate 10 is provided with a plurality of microlenses 8. The method includes the steps of: preparing a substrate 101 with concave portions having two major surfaces, each of the plurality of concave portions 3 having a shape corresponding to that of each of the plurality of microlenses 8 being formed on one of the two major surfaces of the substrate 101 with concave portions; preparing a base material substrate 102' mainly formed of a resin material, the base material substrate 102' having two major surfaces; and pressure-joining the substrate 101 with concave portions to the base material substrate 102' in a heating state. In this case, in the pressure-joining step, the substrate 101 with concave portions is joined to the base material substrate 102' so that the plurality of concave portions 3 are filled with the resin material of the base material substrate 102' which has been melted by the heat.

8 Claims, 7 Drawing Sheets

METHOD OF MANUFACTURING A MICROLENS SUBSTRATE, AN OPPOSED SUBSTRATE FOR A LIQUID CRYSTAL PANEL, A LIQUID CRYSTAL PANEL AND A PROJECTION TYPE DISPLAY APPARATUS

CROSS-REFERENCE TO RELATED APPLICATION

This application is a continuation of U.S. patent application Ser. No. 11/410,844 filed on Apr. 25, 2006. This application claims the benefit of Japanese Patent Application No. 2005-128368 filed Apr. 26, 2005 and Japanese Patent Application No. 2006-61870 filed Mar. 7, 2006. The disclosures of the above applications are incorporated herein by reference.

FIELD OF THE INVENTION

The present invention relates to a method of manufacturing a microlens substrate, an opposed substrate for a liquid crystal panel, a liquid crystal panel and a projection type display apparatus.

BACKGROUND OF THE INVENTION

There is known a projection type display apparatus that projects an image on a screen. In most of such projection type display apparatuses, a liquid crystal panel (liquid crystal light shutter) is used for forming the image.

Such a liquid crystal panel has a configuration in which, for example, an opposed substrate for a liquid crystal panel that is provided with a black matrix, a common electrode and the like is joined to a liquid crystal driving substrate provided with a large number of thin film transistors (TFT) for controlling respective pixels and a large number of pixel electrodes via a liquid crystal layer.

In the liquid crystal panel (TFT liquid crystal panel) having such a configuration, since the black matrix is formed in a portion other than the portions to become the pixels in the opposed substrate for a liquid crystal panel, a region for light transmitting the liquid crystal panel is restricted. This makes light transmittance be lowered.

In order to improve the light transmittance for the liquid crystal panel, there is known a liquid crystal panel in which a large number of minute microlenses are provided at the positions corresponding to the respective pixels in the opposed substrate for a liquid crystal panel. According to such a liquid crystal panel, light transmitting an opposed substrate for a liquid crystal panel is condensed into openings formed in a black matrix, and this makes it possible to improve light transmittance.

As a method of forming such microlenses, for example, a method in which an uncured photocuring resin material is supplied on a substrate with concave portions on one major surface of which a plurality of concave portions for forming microlenses are formed, a flat transparent substrate (cover glass) is joined to the supplied resin material to press and bring into contact with the supplied resin material, and the supplied resin material is then cured, that is, a so-called 2P method is known (for example, see JP-A-2001-92365).

However, in the conventional techniques, steps such as alignment of the cover glass, polish of the cover glass in order to obtain the optimal optical path length are required, and therefore, the manufacturing process of a microlens substrate has been complicated. Further, in the case where the cover glass is polished, there was fear that stains and the like occur due to the polish process. As a result, an appropriate cleaning process is required, and therefore, there is a problem that the manufacturing process has been further complicated and the manufacturing costs are made to be heightened. The complication of the manufacturing process makes a factor of debasement of the microlens substrate, and therefore, there was a possibility that lowering of the yield ratio is generated. In particular, in the 2P method, since a microlens substrate is manufactured using three members including a resin layer formed of a photocuring resin material, a cover glass, and a substrate with concave portions, strain or the like tends to be generated due to difference in coefficients of thermal expansion thereof, and as a result, there is a possibility that characteristics of the microlens substrate such as an optical characteristic are lowered.

SUMMARY OF THE INVENTION

It is one object of the invention to provide a method of manufacturing a microlens substrate which makes it possible to easily manufacture a microlens substrate having stable quality.

It is another object of the invention to provide the microlens substrate manufactured by the method as described above.

Further, it is yet another object of the invention to provide a an opposed substrate for a liquid crystal panel, a liquid crystal panel and a projection type display apparatus provided with the microlens substrate as described above.

In order to achieve the above objects, in one aspect of the invention, the invention is directed to a method of manufacturing a microlens substrate. The method of manufacturing a microlens substrate, the microlens substrate being provided with a plurality of microlenses, the method comprising the steps of:

preparing a substrate with concave portions having two major surfaces, each of the plurality of concave portions having a shape corresponding to that of each of the plurality of microlenses being formed on one of the two major surfaces of the substrate with concave portions;

preparing a base material substrate mainly formed of a resin material, the base material substrate having two major surfaces; and pressure-joining the substrate with concave portions to the base material substrate in a heating state, wherein in the pressure-joining step, the substrate with concave portions is joined to the base material substrate so that the plurality of concave portions are filled with the resin material of the base material substrate which has been melted by the heat.

This makes it possible to easily manufacture a microlens substrate having stable quality.

In the method of the invention, it is preferable that the absolute value of the difference between an index of refraction of the constituent material of the substrate with concave portions and an index of refraction of the resin material is 0.10 or more.

This makes it possible to improve the optical characteristics of the manufactured microlens substrate further.

In the method of the invention, it is preferable that the pressure-joining step is carried out under reduced pressure.

Thus, it is possible to fill the concave portions with the resin material more surely while preventing damage to any of the concave portions in the substrate with concave portions from occurring when filling the concave portions with the resin material and preventing bubbles from penetrating the resin material with which the concave portions are filled more surely.

In the method of the invention, it is preferable that the method further includes the step of prior to the pressure-joining step, subjecting the one major surface of the substrate with concave portions on which the plurality of concave portions are formed to surface treatment for improving adhesion to the resin material.

This makes it possible to improve adhesion between the substrate with concave portions and the resin layer, and therefore, it is possible to improve reliability of the microlens substrate finally obtained.

In the method of the invention, it is preferable that, in the case where the thickness of the base material substrate prior to the pressure-joining step is defined as $T_1$ (mm) and the thickness from a flat portion of the substrate with concave portions at which the base material substrate is joined to the substrate with concave portions to one major surface of the base material substrate at which the base material substrate is not joined to the substrate with concave portions is defined as $T_2$ (mm), then $T_1$ and $T_2$ satisfy the relation: $0.5 \leq T_2/T_1 \leq 0.95$.

Thus, it is possible to use the resin material constituting the base material substrate efficiently while making the optical path length of the incident light made incident on the formed microlenses.

In the method of the invention, it is preferable that the resin material is a thermoplastic resin material.

Thus, it is possible to fill the concave portions with the resin material more easily, and it is possible to improve durability (heat resistance) of the microlens substrate finally obtained.

In the method of the invention, it is preferable that the pressure-joining step is carried out at a temperature higher than a glass transformation point of the resin material.

This makes it possible to fill the concave portions with the resin material more surely.

In the method of the invention, it is preferable that the glass transformation point of the resin material is 100° C. or higher.

Thus, it is possible to fill the concave portions with the resin material more easily, and it is possible to improve durability (heat resistance) of the microlens substrate finally obtained.

In the method of the invention, it is preferable that the base material substrate is formed of a thermosetting resin material in a state where all monomers constituting the thermosetting resin material have not reacted so that the thermosetting resin material is not completely hardened.

This makes it possible to omit steps such as a step of joining the cover glass, a step of polish, an appropriate cleaning step as required in the method of manufacturing a microlens substrate, and therefore, it is possible to prevent complication of the manufacturing process of the microlens substrate. As a result, by easier method, it is possible to manufacture a microlens substrate having stable quality. Further, by using the thermosetting resin material, it is possible to improve heat resistance and chemical resistance of the microlens substrate finally obtained, in particular.

In the method of the invention, it is preferable that the base material substrate contains a solvent for dissolving the monomers constituting the thermosetting resin material, and the amount of the solvent contained in the base material substrate is in the range of 1 to 30%.

Thus, the base material substrate has an appropriate regular shape at a usual state, and has more appropriate softness (flexibility) while the base material substrate is pressure-joined. Namely, it is possible to fill the concave portions with the thermosetting resin material at the pressure-joining step more surely.

In the method of the invention, it is preferable that in the pressure-joining step the solvent is removed.

Thus, it is possible to cure the thermosetting resin material with which the concave portions are filled more surely, and it is possible to heighten the heat resistance of the microlens substrate finally obtained further.

In another aspect of the invention, the invention is directed to a microlens substrate. The microlens substrate of the invention is manufactured using the method defined as described above.

This makes it possible to provide a microlens substrate having stable quality.

In yet another aspect of the invention, the invention is directed to an opposed substrate for a liquid crystal panel. The opposed substrate for a liquid crystal panel of the invention includes the microlens substrate defined as described above.

This makes it possible to provide an opposed substrate for a liquid crystal panel having stable quality.

In still another aspect of the invention, the invention is directed to a liquid crystal panel. The liquid crystal panel of one embodiment according to the invention includes the opposed substrate for a liquid crystal panel defined as described above.

This makes it possible to provide a liquid crystal panel having stable quality.

In another embodiment of the invention, a liquid crystal panel of the invention includes:

a liquid crystal driving substrate provided with a large number of pixel electrodes;

the opposed substrate for a liquid crystal panel defined as described above, the opposed substrate for a liquid crystal panel being joined to the liquid crystal driving substrate so as to form a gap between the liquid crystal driving substrate and the opposed substrate for a liquid crystal panel; and liquid crystal filled in the gap.

This makes it possible to provide a liquid crystal panel having stable quality.

In the liquid crystal panel of the invention, it is preferable that the liquid crystal driving substrate is a TFT substrate which includes the large number of pixel electrodes disposed in a matrix form, and a large number of thin film transistors respectively connected to the large number of pixel electrodes.

This makes it possible to provide a liquid crystal panel having stable quality.

In still yet another aspect of the invention, the invention is directed to a projection type display apparatus. The projection type display apparatus of the invention includes a plurality of light valves respectively provided with the liquid crystal panel defined as described above, wherein an image is projected using at least one of the plurality of light valves.

This makes it possible to provide a projection type display apparatus having stable quality.

BRIEF DESCRIPTION OF THE DRAWINGS

The foregoing and other objects, features and advantages of the invention will become more readily apparent from the following detailed description of preferred embodiments of the invention which proceeds with reference to the appending drawings.

DETAILED DESCRIPTION OF THE INVENTION

Preferred embodiments of a method of manufacturing a microlens substrate, an opposed substrate for a liquid crystal panel, a liquid crystal panel and a projection type display apparatus according to the invention will now be described in detail with reference to the appending drawings.

Figure 1:
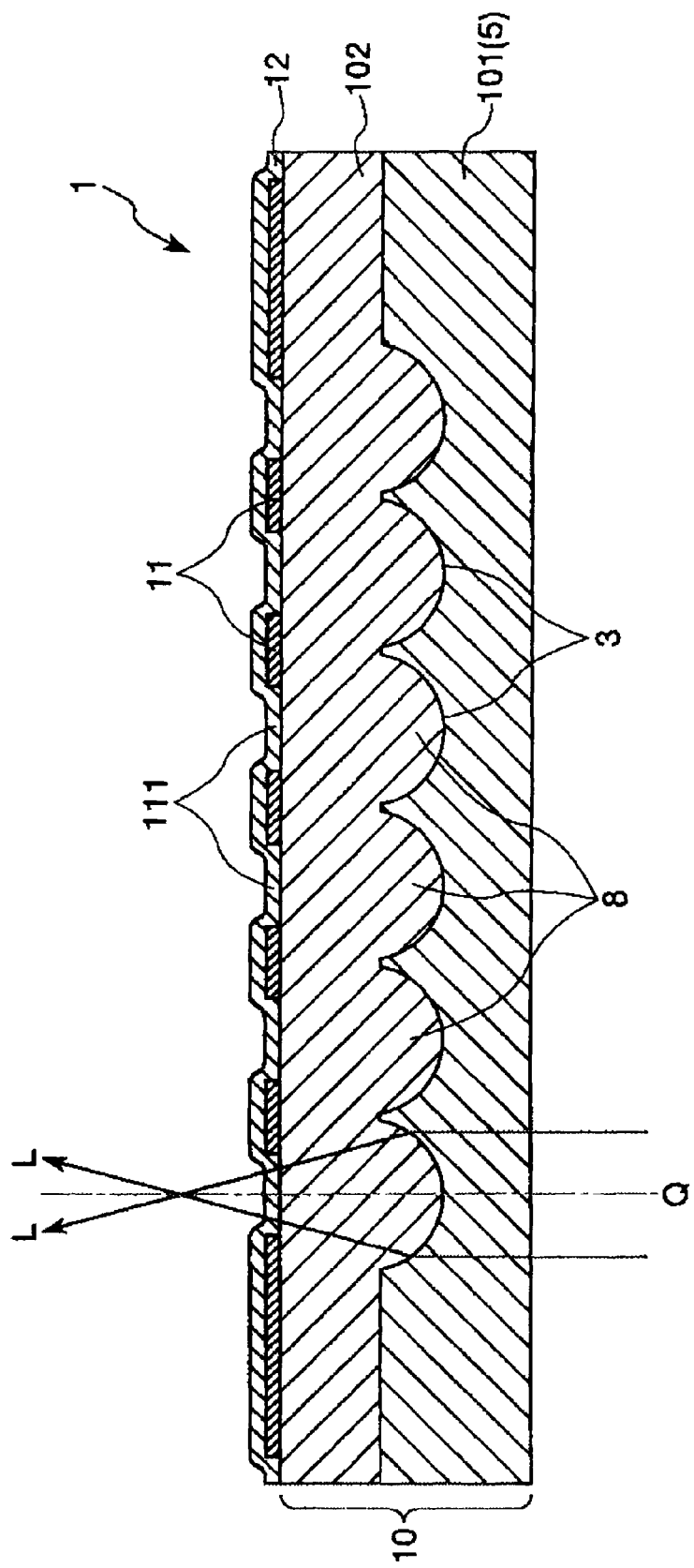
FIG. 1 is a schematic longitudinal cross-sectional view which shows an opposed substrate for a liquid crystal panel of the invention.

FIG. 1 is a schematic longitudinal cross-sectional view which shows an opposed substrate for a liquid crystal panel of the invention.

First, a description will be given for an opposed substrate for a liquid crystal panel.

As shown in FIG. 1, an opposed substrate 1 for a liquid crystal panel includes: a microlens substrate 10; a black matrix 11 formed on one major surface of the microlens substrate 10 and having a plurality (large number) of openings 111; a transparent conductive film 12 formed so as to cover the black matrix 11 on the microlens substrate 10.

As shown in FIG. 1, the microlens substrate 10 is constituted from a substrate 101 with concave portions and a transparent resin layer 102.

Further, the substrate 101 with concave portions is made from a glass substrate 5 on one major surface of which a plurality of concave portions (concave portions for microlenses) 3 are formed. Moreover, in the resin layer 102, a plurality of microlenses 8 are formed of a resin material with which the plurality of concave portions 3 in the substrate 101 with concave portions are filled.

It is preferable that the absolute value of the difference between an index of refraction of the glass material constituting the substrate 101 with concave portions and an index of refraction of the resin material constituting the resin layer 102 is 0.10 or more. More preferably the absolute value of the difference is 0.10 or more. This makes it possible to improve the optical characteristics of the microlens substrate 1 (microlenses 8) further. In this regard, the constituent material of each of the substrate 101 with concave portions and the resin layer 102 will be described later.

In the opposed substrate 1 for a liquid crystal panel, the black matrix 11 having a light shielding function is provided so as to correspond the position of each of the microlenses 8. More specifically, the black matrix 11 is provided so that an optical axis Q of each of the microlenses 8 passes through the corresponding opening 111 formed in the black matrix 11. Thus, incident light L entering the opposed substrate 1 for a liquid crystal panel from one major surface thereof which faces the black matrix 11 is condensed by each of the microlenses 8 of the resin layer 102, and passes through the corresponding opening 111 in the black matrix 11. Further, the transparent conductive film 12 is an electrode having transparent, and light can penetrate the transparent conductive film 12. For this reason, the amount of light of the incident light L is prevented from being attenuated seriously when the incident light L passes through the opposed substrate 1 for a liquid crystal panel. In other words, the opposed substrate 1 for a liquid crystal panel has high light transmittance.

In the opposed substrate 1 for a liquid crystal panel, one microlens 8 and the corresponding opening 111 in the black matrix 11 correspond one pixel.

In this regard, the substrate 101 with concave portions may be provided with any other component such as an antireflection layer.

First Embodiment

Next, a first embodiment of a method of manufacturing a microlens substrate according to the invention will now be described in detail with reference to the appending drawings. FIG. 2 is a schematic longitudinal cross-sectional view which shows a method of manufacturing a substrate with concave portions for forming a microlens substrate of the invention. FIG. 3 is a schematic longitudinal cross-sectional view which shows a method of manufacturing the microlens substrate in a first embodiment of the invention.

The method of manufacturing a microlens substrate according to the invention includes the step of pressure-joining the substrate 101 with concave portions as described above to a base material substrate (to be the lens layer 102) mainly formed of the resin material in a heating state.

<Manufacture of Substrate with Concave Portions>

First, one example of a method of manufacturing the substrate with concave portions constituting a part of the microlens substrate according to the invention will be described with reference to the appending drawings.

A glass substrate 5 is first prepared. It is preferable that a substrate having a uniform thickness without flexure and blemishes is used for the glass substrate 5. Further, it is also preferable that a substrate with a surface cleaned by washing or the like is used for the glass substrate 5.

As for a constituent material for the glass substrate 5, for example, soda-lime glass, crystalline glass, quartz glass, lead glass, potassium glass, borosilicate glass, alkali-free glass and the like may be mentioned. It is preferable to use quartz glass among them. The quartz glass has high mechanical strength and heat resistance. Further, the quartz glass also has very low coefficient of linear expansion. Thus, since the quartz glass hardly changes its shape due to heat, it is possible to use the quartz glass in the method of manufacturing a microlens substrate appropriately. Moreover, the quartz glass has an advantage that it is hardly deteriorated due to light energy because it has highlight transmittance for light of a short wavelength range.

Figure 2A:
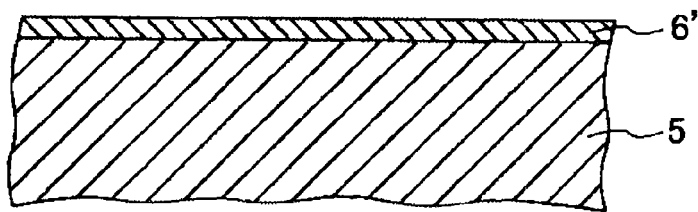
FIG. 2 is a schematic longitudinal cross-sectional view which shows a method of manufacturing a substrate with concave portions for forming a microlens substrate of the invention.

<1> As shown in FIG. 2(a), a film 6' for forming a mask is formed on the surface of the prepared glass substrate 5 (mask formation process). The film 6' for forming a mask functions as a mask by forming a plurality of openings (initial holes) therein at a subsequent process.

It is preferable that the film 6' for forming a mask permits initial holes 61 to be formed therein (will be described later) by means of irradiation with laser beams or the like, and has resistance to etching at an etching process (will be described later). In other words, it is preferable that the film 6' for forming a mask is constituted so that it has an etching rate nearly equal to or smaller than that of the glass substrate 5.

From such a viewpoint, for example, metals such as Cr, Au, Ni, Ti, Pt, and the like, alloys containing two or more kinds selected from these metals, oxides of these metals (metal oxides), silicon, resins, or the like may be mentioned as the material for the film 6' for forming a mask (that is, a mask 6).

Alternatively, the mask 6 may be given a laminated structure by a plurality of layers formed of different materials such as a Cr/Au laminate or a chromium oxide/chromium laminate.

The method of forming the film 6' for forming a mask is not particularly limited. In the case where the film 6' for forming a mask is constituted from metal materials (including alloy) such as Cr and Au or metal oxides such as chromium oxide, the film 6' for forming a mask can be suitably formed by an evaporation method, a sputtering method, or the like, for example. On the other hand, in the case where the mask 6 is formed of silicon, the film 6' for forming a mask can be suitably formed by a sputtering method, a CVD method, or the like, for example.

Although the thickness of the film 6' for forming a mask (mask 6) also varies depending upon the constituent material of the film 6' for forming a mask, it is preferable that the thickness is in the range of 0.01 to 2.0 μm, and more preferably it is in the range of 0.05 to 0.2 μm. If the thickness is below the lower limits given above, there is a possibility to deform the shape of each of the initial holes 61 formed at an initial hole formation process. In addition, there is a possibility that sufficient protection for the masked portion on the glass substrate 5 cannot be obtained when subjecting the glass substrate 5 to a wet etching process at the etching process (will be described later). On the other hand, if the thickness is over the upper limits given above, in addition to the difficulty in formation of the initial holes 61 each passing through the glass substrate 5 at the initial hole formation process (will be described later), there will be a case in which the film 6' for forming a mask tends to be easily removed due to internal stress of the film 6' for forming a mask depending upon the constituent material or the like of the film 6' for forming a mask.

<2> Next, as shown in FIG. 2(*b*), the plurality of initial holes 61 that will be utilized as mask openings at the etching process (will be described later) are formed in the film 6' for forming a mask by means of the physical method or the irradiation with laser beams (initial hole formation process). Thus, a mask 6 having a predetermined opening pattern is obtained.

Although the initial holes 61 may be formed by any method, it is preferable that the initial holes 61 are formed by means of the physical method or the irradiation with laser beams. This makes it possible to manufacture the substrate with concave portions for forming a microlens substrate with high productivity, for example. In particular, the concave portions can be easily formed on a relatively large-sized substrate with concave portions.

As for the physical method of forming the initial holes 61, for example, blast processing such as shot blast, sand blast or the like, etching, pressing, dot printing, tapping, rubbing, or the like may be mentioned. In the case where the initial holes 61 are formed by means of the blast processing, it is possible to form the initial holes 61 with high efficiency in a shorter time even for a glass substrate 5 with a relatively large area (that is, area of the region for formation of microlenses 8).

Further, in the case where the initial holes 61 are formed by means of irradiation with laser beams, the kind of laser beams to be used is not particularly limited, but a ruby laser, a semiconductor laser, a YAG laser, a femtosecond laser, a glass laser, a $YVO_4$ laser, a Ne—He laser, an Ar laser, a carbon dioxide laser, an excimer laser or the like may be mentioned. Moreover, a wavelength of each of such lasers such as SHG, THG and FHG may be utilized. In the case where the initial holes 61 are formed by means of the irradiation of laser beams, it is possible to easily and precisely control the size of each of the initial holes 61, distance between adjacent initial holes 61, or the like.

<3> Next, as shown in FIG. 2(*c*), a large number of concave portions 3 are formed on the glass substrate 5 by subjecting the glass substrate 5 to the etching process using the mask 6 in which the initial holes 61 have been formed (etching process).

The etching method is not particularly limited, and a wet etching process, a dry etching process or the like may be mentioned as an example. In the following explanation, the case of using the wet etching process will be described as an example.

By subjecting the glass substrate 5 covered with the mask 6 in which the initial holes 61 are formed to the etching (wet etching process), as shown in FIG. 2(*d*), the substrate 5 is eroded from the portions where no mask is present, namely, from the initial holes 61, whereby a large number of concave portions 3 are formed on the glass substrate 5. By using the wet etching process in this manner, it is possible to form the large number of concave portions 3 appropriately. In the case where an etchant containing hydrofluoric acid (hydrofluoric acid-based etchant) is utilized as an etchant, for example, the glass substrate 5 is eroded more selectively, and this makes it possible to form the concave portions 3 appropriately.

<4> Next, as shown in FIG. 2(*e*), the mask 6 is removed (mask removal process). The mask 6 can be removed by means of etching or the like.

As described above, as shown in FIG. 2(*d*), a substrate 101 with concave portions on which the large number of concave portions 3 are formed is obtained.

In this case, a back surface protective film formed of the same material as that of the film 6' for forming a mask may be provided on the major surface (back surface) of the glass substrate 5 opposite to the major surface on which the plurality of concave portions 3 are formed when the film 6' for forming a mask is formed if needed. This makes it possible to maintain the thickness of the glass substrate 5 because the whole back surface of the glass substrate 5 is not subjected to an etching process.

It is preferable that the average diameter of each of the concave portions 3 in the substrate 101 with concave portions obtained as described above when viewed from above the substrate 101 with concave portions is in the range of 5 to 100 μm, and more preferably it is in the range of 10 to 50 μm. Thus, in the case where a liquid crystal panel is manufactured using the substrate 101 with concave portions thus obtained, for example, an image projected on a screen of such a liquid crystal panel has excellent resolution.

Further, it is preferable that the average radius of curvature in the vicinity of the central portion of each of the concave portions 3 is in the range of 2.5 to 50 μm, and more preferably it is in the range of 5 to 25 μm. Thus, in the case where a microlens substrate is manufactured using the substrate 101 with concave portions having such concave portions 3, each of the microlenses in the microlens substrate can have excellent optical characteristics, in particular.

Moreover, the depth of each of the concave portions 3 in the vicinity of the central portion thereof is in the range of 5 to 100 μm, and more preferably it is in the range of 10 to 50 μm. Thus, in the case where a microlens substrate is manufactured using the substrate 101 with concave portions having such concave portions 3, each of the microlenses in the microlens substrate can have excellent optical characteristics, in particular.

<Adhesion Improving Process>

Next, the major surface of the substrate 101 with concave portions on which the concave portions 3 are formed is subjected to surface treatment to improve adhesion to the resin material (adhesion improving process). This makes it possible to improve adhesion of the resin layer 102 to the substrate 101 with concave portions, and therefore, it is possible to improve reliability of the microlens substrate 10 finally obtained.

As for such an adhesion improving process, for example, surface treatment using a silane coupling agent, surface treatment using a surfactant and the like may be mentioned. In particular, the surface treatment using a silane coupling agent is preferable among them. This makes it possible to carry out the adhesion improving process more efficiently.

As for the silane coupling agent, for example, vinyl trimethoxysilane, 3-glycidoxypropyltrimethoxysilane, 3-methacryloxypropyl trimethoxysilane, N-2-(aminoethyl)-3-aminopropyl trimethoxysilane, 3-aminopropyl trimethoxysilane, hexamethyldisilazane (HMDS), 3-mercaptopropyl trimethoxysilane, octadecyl dimethylchlorosilane (ODS) and the like may be mentioned.

It is preferable to use 3-glycidoxypropyltrimethoxysilane among them. This makes it possible to improve adhesion to the resin material more efficiently.

In this regard, the major surface of the substrate 101 with concave portions on which the concave portions 3 are formed need not be subjected to the adhesion improving process as described above. Even in the case where the adhesion improving process is not carried out, as will be described later, adhesion of the resin layer 102 to the substrate 101 with concave portions is made to be relatively high due to anchor effect because the concave portions 3 in the substrate 101 with concave portions are filled with the resin material.

<Pressure-Joining Process>

Next, the substrate 101 with concave portions as described above is pressure-joined to a resin substrate (base material substrate) 102' mainly formed of a resin material in a heating state (pressure-joining process). Thus, the inside of each of the concave portions 3 in the substrate 101 with concave portions is filled with the melted resin material, and therefore, the substrate 101 with concave portions is joined to the resin substrate 102' (that is, resin layer 102).

Now, in a 2P method used as a method of manufacturing a microlens substrate heretofore, since a cover glass is used for the method, there has been need to carry out a step of aligning the cover glass, a step of polishing the cover glass in order to obtain the optimal optical path length. Therefore, there has been a problem that the manufacturing process is complicated. Further, in the case where the cover glass is polished, stains and the like may occur due to the polish process. As a result, there has been a problem that since an appropriate cleaning process is required, the manufacturing process becomes more complicated and the manufacturing costs become higher and higher. Moreover, the complication of the manufacturing process results in lowering of the quality of the manufactured microlens substrate and lowering of a yield rate of manufacturing the microlens substrates. In particular, in the 2P method, since a microlens substrate is manufactured using three members including a resin layer formed of a photocuring resin material, a cover glass, and a substrate with concave portions, strain or the like tends to be generated due to difference in coefficients of thermal expansion thereof, and as a result, there is a problem that characteristics of the microlens substrate such as an optical characteristic tend to be lowered.

On the contrary, in the invention, at the pressure-joining process, a base material substrate having a predetermined shape and mainly formed of a resin material is pressure-joined to a substrate with concave portions, and thus, the substrate with concave portions is joined to the base material substrate so that the concave portions in the substrate with concave portions are filled with a resin material of the base material substrate. Therefore, it is possible to manufacture a microlens substrate having stable quality. In other words, in the method of manufacturing a microlens substrate of the invention, since the joining step of a cover glass is not required, it is possible to omit a polish process, the appropriate cleaning process and the like, and therefore, the manufacturing process for a microlens substrate is not made to be complicated. As a result, it is possible to obtain a microlens substrate by a simple method. Furthermore, since the method of manufacturing a microlens substrate is simple, it is possible to prevent quality of the manufactured microlens substrate from lowering, and variation in quality of each of manufactured microlens substrates can be reduced. Further, compared with a conventional method, it is possible to prevent distortion or the like from occurring due to the difference in coefficients of thermal expansion of the components constituting a microlens substrate, and therefore, it is possible to provide a microlens substrate having excellent optical characteristics. Moreover, in a conventional method, since an uncured resin material is cured in a state where the uncured resin material is sandwiched between a substrate with concave portions and a cover glass, distortion or the like may be generated in the microlens substrate due to change in the volume of the resin material before and after curing. On the other hand, in the invention, the base material substrate is pressure-joined to a substrate with concave portions in a melten state (heating state) where a part of the resin material is allowed to be transformed due to heat. Thus, it is possible to reduce change in the volume of the cured resin material, and therefore, it is possible to provide a microlens substrate having excellent optical characteristics, in particular.

Hereinafter, the pressure-joining process will concretely be described with reference to the appending drawings.

<1> First, a resin substrate (base material substrate) 102' mainly formed of a resin material is prepared, and as shown in FIG. 3(*a*), the resin substrate 102' is mounted on one major surface of the substrate 101 with concave portions obtained as described above on which the concave portions 3 are formed.

In the present embodiment, a thermoplastic resin is used as the resin material constituting the resin substrate 102'. By using the thermoplastic resin, a part of the resin substrate 102' can be made to become a transformable state by heat. By pressure-joining the resin substrate 102' to the substrate 101 with concave portions at this state, it is possible to fill the concave portions 3 in the substrate 101 with concave portions with the resin material. As a result, it is possible to manufacture a microlens substrate 10 having stable quality more easily. In addition, it is possible to improve durability (heat resistance) of the microlens substrate finally obtained.

As for the thermoplastic resin, for example, polyolefin such as polyethylene, polypropylene, ethylene-vinyl acetate copolymer and the like, denatured polyolefin, polyamide (such as nylon 6, nylon 46, nylon 66, nylon 610, nylon 612, nylon 11, nylon 12, nylon 6-12, nylon 6-66), thermoplastic polyimide, liquid crystal polymer such as aromatic polyester, polyphenylene oxide, polyphenylene sulfide, polycarbonate, polymethyl methacrylate, polyether, polyether ether ketone, polyether imide, polyacetal, various thermoplastic elastomers such as styrene based elastomer, polyolefin based elastomer, polyvinylchloride based elastomer, polyurethane based elastomer, polyester based elastomer, polyamide based elastomer, polybutadiene based elastomer, trans-polyisoprene based elastomer, fluorocarbon rubber based elastomer, chlorinated polyethylene based elastomer and the like, and copolymers, blended bodies and polymer alloys and the like having at least one of these materials as a main ingredient may be mentioned. Further, in this invention, a mixture of two or more kinds of these materials may be utilized.

Among the thermoplastic resins as described above, in particular, it is preferable to utilize polyester based elastomer (polyester resin). In the case where the substrate 101 with concave portions is subjected to the adhesion improving process as described above, it is possible to improve the adhesion of the resin substrate 102' to the substrate 101 with concave portions when the polyester based elastomer is utilized because the effect of the adhesion improving process appears more distinctly.

It is preferable that the glass transformation point Tg of the resin material as described above (thermoplastic resin) is 100° C. or more, and more preferably it is in the range of 150 to 220° C. Thus, it is possible to fill the concave portions 3 in the substrate 101 with concave portions with the resin material more surely, and it is possible to improve durability (heat resistance) of a microlens substrate 10 finally obtained.

<2> Next, the substrate 101 with concave portions is subjected to heating.

In the case where thermoplastic resin is used as the resin material constituting the resin substrate 102', it is preferable that the heating temperature T for the substrate 101 with concave portions is the glass transformation point Tg (° C.) of the resin material or more, and more preferably T and Tg satisfy the relation: $Tg+10 \leq T \leq Tg+50$. In the case where the heating temperature T is below the lower limit given above, the concave portions 3 may not be filled with the resin material sufficiently depending upon the kind of resin material.

Figure 3A:
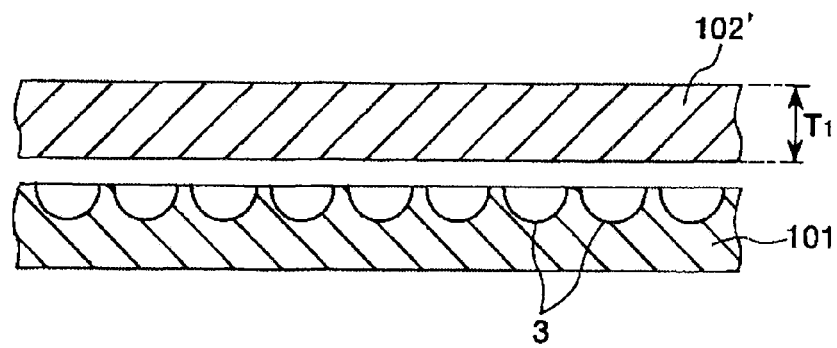
FIG. 3 is a schematic longitudinal cross-sectional view which shows a method of manufacturing the microlens substrate in a first embodiment of the invention.
Figure 3B:
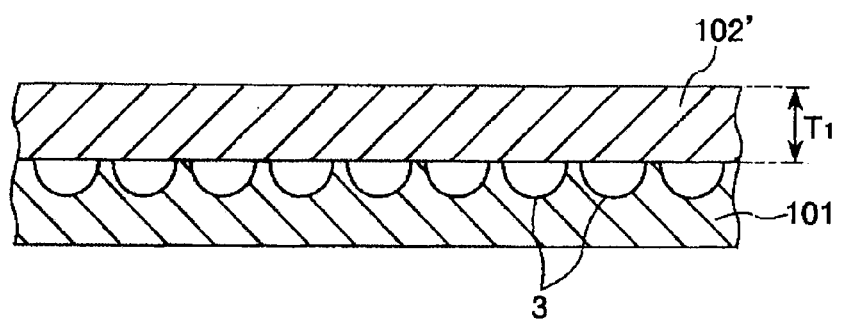

<3> Next, as shown in FIG. 3(b), the heated resin substrate 102' is brought into contact with the heated substrate 101 with concave portions. Thus, the surface of the resin substrate 102' is heated by the substrate 101 with concave portions, and therefore, the resin material (thermoplastic resin) is softened to become transformable.

In this regard, it is preferable that the resin substrate 102' may be subjected to heating while the major surface of the glass substrate 102' opposite to the other major surface thereof which faces the substrate 101 with concave portions is cooled. This makes it possible to fill the concave portions 3 in the substrate 101 with concave portions with the resin material while maintaining smoothness of the other major surface of the resin substrate 102'.

<4> Next, the concave portions 3 are filled with the resin material by pressure-joining the resin substrate 102' to the substrate 101 with concave portions in the heated state as described above. Then, the resin substrate 102' and the substrate 101 with concave portions are cooled, and the resin layer 102 is formed from the resin substrate 102'. Thus, as shown in FIG. 3(c), a microlens substrate 10 in which the resin layer 102 is joined to the substrate 101 with concave portions (that is, a microlens substrate of the invention) is obtained.

It is preferable that the pressure-joining process as described above is carried out under reduced pressure. Thus, it is possible to prevent bubbles from penetrating the resin material with which the concave portions 3 are filled more surely when filling the concave portions 3 with the resin material.

More specifically, it is preferable that the ambient pressure during the pressure-joining process is 100 Pa or less, and more preferably it is 10 Pa or less. Thus, it is possible to fill the concave portions 3 with the resin material more surely while preventing damage to any of the concave portions 3 in the substrate 101 with concave portions from occurring when filling the concave portions 3 with the resin material and preventing bubbles from penetrating the resin material with which the concave portions 3 are filled more surely.

Figure 3C:
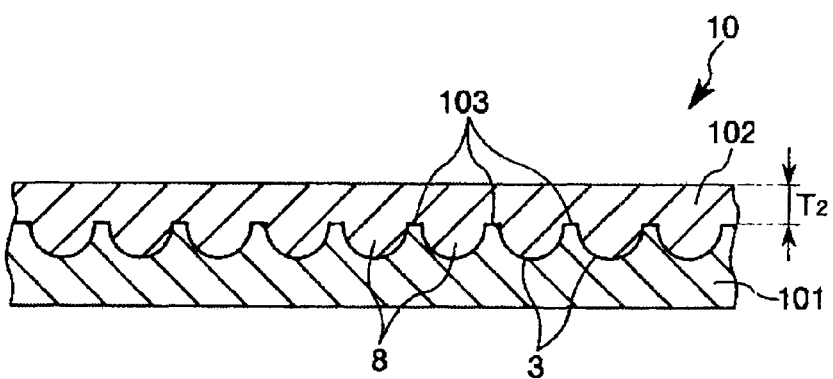

Further, by appropriately adjusting the thickness from a flat portion 103 shown in FIG. 3(c) in the joining surface between the resin surface 102' and the substrate 101 with concave portions at the pressure-joining process to one major surface of the resin substrate 102' opposite to the joining surface, that is, the thickness of the portion at which the microlenses 8 in the formed resin layer 102 are not formed, it is possible to make the optical path length entering each of the formed microlenses 8 optimal.

In the case where the thickness of the resin substrate 102' before the pressure-joining process is defined as T1 (mm) and the thickness of the portion at which the microlenses 8 in the resin layer 102 are not formed is defined as T2 (mm), then T1 and T2 satisfy the relation: $0.5 \leq T2/T1 \leq 0.95$, and more preferably T1 and T2 satisfy the relation: $0.6 \leq T2/T1 \leq 0.8$. In the case where T1 and T2 satisfy such relation, it is possible to fill the concave portions 3 with the glass material more surely while preventing damage to any of the concave portions 3 in the substrate 101 with concave portions from occurring. Further, it is possible to form the resin layer 102 from the resin substrate 102' efficiently while making the optical path length entering each of the microlenses 8 formed in the substrate 101 with concave portions optimal.

In this regard, even though it has been described that only the substrate 101 with concave portions is subjected to heating in the above explanation, both the substrate 101 with concave portions and the resin substrate 102' may be subjected to heating in the invention.

Second Embodiment

Next, a second embodiment of a method of manufacturing a microlens substrate according to the invention will now be described in detail with reference to the appending drawing. In this regard, differences between the first embodiment described above and the second embodiment are chiefly described, and the description of the similar portions is omitted. FIG. 4 is a schematic longitudinal cross-sectional view which shows a method of manufacturing the microlens substrate in a second embodiment of the invention.

In the present embodiment, at a pressure-joining process, a substrate 101 with concave portions is pressure-joined to a resin substrate (base material substrate) 102', which is mainly formed of a thermosetting resin material in a state where all monomers constituting the thermosetting resin material have not reacted so that the thermosetting resin material is not completely hardened, in a heating state. In other words, a microlens substrate 10 is manufactured in a manner similar to that in the first embodiment described above except that a thermosetting resin material in a state where all monomers constituting the thermosetting resin material have not reacted so that the thermosetting resin material is not completely hardened is used as a resin material constituting the resin substrate 102'.

Since the resin substrate 102' formed of the thermosetting resin material in a state where all monomers constituting the thermosetting resin material have not reacted so that the thermosetting resin material is not completely hardened can be transformed by appropriate force, it is possible to fill the concave portions 3 in the substrate 101 with concave portions with the thermosetting resin material at the pressure-joining process easily. In addition, it is possible to harden (cure) the thermosetting resin material with which the concave portions are filled using the heated substrate 101 with concave portions. Thus, it is possible to omit a joining process of a cover glass, a polish process, an appropriate cleaning process and the like which are required in a conventional method of manufacturing a microlens substrate, and therefore, it is possible to prevent the manufacturing process for a microlens substrate from being made to be complicated. As a result, it is possible to obtain a microlens substrate having stable quality by a simpler method. Further, by using the thermosetting resin material, it is possible to improve heat resistance and chemical resistance of the microlens substrate 10 finally obtained.

In this regard, the "state where all monomers constituting the thermosetting resin material have not reacted so that the thermosetting resin material is not completely hardened" means a state where a part of all monomers constituting the thermosetting resin material has not reacted and still remains in the resin substrate 102'.

Further, a solvent for dissolving monomers constituting thermosetting resin material also remains in the thermosetting resin material in a state where all monomers constituting the thermosetting resin material have not reacted so that the thermosetting resin material is not completely hardened.

It is preferable that the content of the solvent as described above in the resin substrate 102' is in the range of 1 to 30 weight by %, and more preferably it is in the range of 1 to 15 weight by %. Thus, the resin substrate 102' has an appropriate regular shape at a usual state, and has more appropriate softness (flexibility) while the resin substrate 102' is pressure-joined. Namely, it is possible to fill the concave portions 3 with the thermosetting resin material at the pressure-joining step more surely.

As for such a solvent, for example, butanol, dimethylacetamide, propylene glycol monomethyl ether acetate (PG-MEA), γ-butyl lactone and the like may be mentioned.

In this case, the solvent as described above is vaporized and eliminated due to heat when the substrate 101 with concave portions is pressure-joined to the resin substrate 102'. Thus, it is possible to harden (cure) the thermosetting resin material with which the concave portions 3 are filled more surely, and it is possible to heighten heat resistance of the microlens substrate 10 finally obtained further.

As for the thermosetting resin material as described above, for example, phenol resin, urea resin, melamine resin, epoxy resin, alkyd resin, unsaturated polyester resin, diallyphthalate resin, and the like may be mentioned. One kind of them or mixture of two or more kinds of them can be used.

Hereinafter, the pressure-joining process in the present embodiment will concretely be described with reference to the appending drawings.

<1> First, a resin substrate (base material substrate) 102' mainly formed of thermosetting resin material as described above is prepared, and as shown in FIG. 4(a), the resin substrate 102' is mounted on one major surface of the substrate 101 with concave portions obtained in a manner similar to that in the first embodiment as described above on which the concave portions 3 are formed.

<2> Next, the substrate 101 with concave portions is subjected to heating.

In the present embodiment, in the case where the heating temperature for the substrate 101 with concave portions when the resin substrate 102' is pressure-joined to the substrate 101 with concave portions is defined as T (° C.) and the temperature at which the thermosetting resin material is cured (the temperature at which remaining monomers start to react) is defined as $T_3$ (° C.), it is preferable that T and satisfy the relation: $T_3 < T < T_3 + 30$, and more preferably T and $T_3$ satisfy the relation: $T_3 + 10 < T < T_3 + 20$. In the case where the heating temperature is below the lower limits given above, it may be difficult to harden (cure) the thermosetting resin material sufficiently depending upon the kind of thermosetting resin material. In the case where the heating temperature T is over the upper limits given above, the concave portions 3 may not be filled with the resin material sufficiently depending upon the kind of thermosetting resin material.

<3> Next, the concave portions 3 are filled with the resin material by pressure-joining the thermosetting resin substrate 102' to the substrate 101 with concave portions in the heated state as described above. The filled thermosetting resin material is hardened (cured) due to heat of the substrate 01 with concave portions. Then, the resin substrate 102' and the substrate 101 with concave portions are cooled, and the resin layer 102 is formed from the resin substrate 102'. Thus, as shown in FIG. 4(b), a microlens substrate 10 in which the resin layer 102 is joined to the substrate 101 with concave portions (that is, a microlens substrate of the invention) is obtained.

Next, a method of manufacturing an opposed substrate for a liquid crystal panel according to the invention will now be described.

Figure 5:
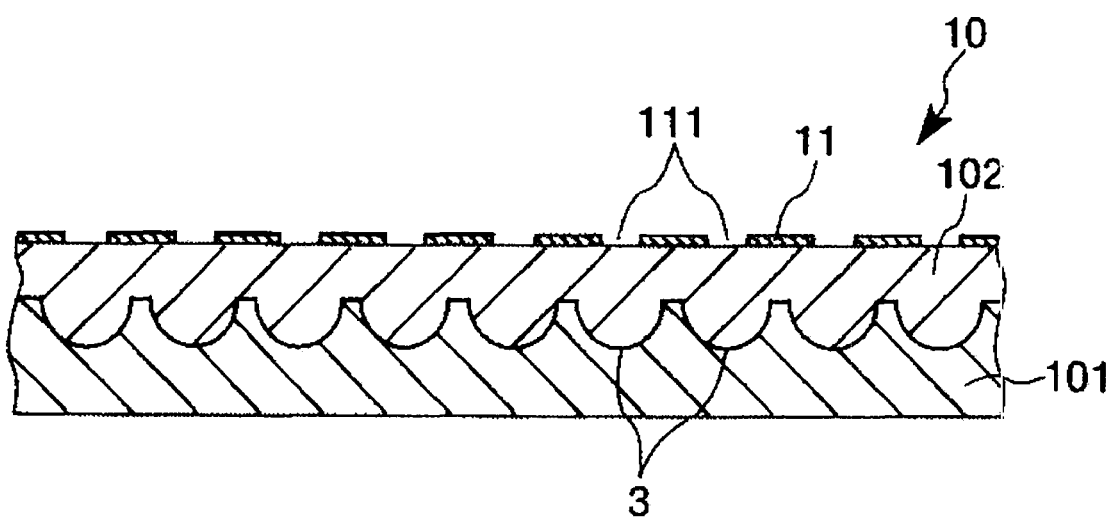
FIG. 5 is a schematic longitudinal cross-sectional view which shows a method of manufacturing the opposed substrate for a liquid crystal panel of the invention.

<1> As shown in FIG. 5, a black matrix 11 in which a plurality of openings 111 are formed is formed on the resin layer 102 of the microlens substrate 10 obtained as described above. In this case, the black matrix 11 is formed so that the plurality of openings 111 respectively correspond to the microlenses 8, more specifically, so that an optical axis Q of each of the microlenses 8 passes through the corresponding opening 111 formed in the black matrix 11 (see FIG. 1).

The black matrix 11 is formed of, for example, a metal film such as a Cr film, an Al film, an Al alloy film, a Ni film, a Zn film, or a Ti film or a resin layer in which carbon or titanium is dispersed. Among them, it is preferable that the black matrix 11 is formed of a Cr film or an Al alloy film. In the case where the black matrix 11 is formed of the Cr film, it is possible to obtain a black matrix 11 having an excellent light blocking function. On the other hand, in the case where the black matrix is formed of the Al alloy film, it is possible to obtain an opposed substrate 1 for a liquid crystal panel having excellent radiation performance.

From the viewpoint to prevent influence on the smoothness of the opposed substrate 1 for a liquid crystal panel, it is preferable that the thickness of the black matrix 11 is in the range of about 0.03 to 1.0 µm, and more preferably it is in the range of about 0.05 to 0.3 µm.

For example, it is possible to form the black matrix 11 in which the plurality of openings 111 are formed on the microlens substrate 10 (that is, lens portion 102) as follows.

A thin film to be the black matrix 11 is first formed on the resin layer 102 by means of a vapor film formation method such as a spattering method. Next, a resist film is formed on the thin film to be the black matrix 11. The resist film is subjected to exposure so that each of the plurality of openings 111 in the black matrix 11 is formed at the position of the corresponding microlens 8 (or the concave portion 3), whereby a pattern for the openings 111 is formed in the resist film. Next, the resin layer 102 with the resist film is subjected to a wet etching process, whereby only portions to become the openings 111 are removed from the thin film. The resist film is then removed. In this regard, in the case where the thin film to be the black matrix 11 is formed of Al alloy, it is possible to use a phosphate system etchant as a releasing liquid for the wet etching process. Alternatively, the black matrix 11 in which the openings 111 are formed may be formed by means of a dry etching process using a chloride system gas appropriately.

<2> Next, a transparent conductive film (common electrode) 12 is formed on the resin layer 102 so as to cover the black matrix 11 therewith. In this way, a wafer in which one or more opposed substrate 1 for a liquid crystal panel is formed can be obtained.

The transparent conductive film 12 is formed of, for example, indium tin oxide (ITO), indium oxide (IO), tin oxide ($SnO_2$). Further, it is preferable that the thickness of the transparent conductive film 12 is in the range of 0.03 to 1 μm, and more preferably it is in the range of 0.05 to 0.30 μm. In this case, the transparent conductive film 12 can be formed on the resin layer 102 by means of a sputtering method.

<3> Finally, the wafer is cut into one or more opposed substrate 1 for a liquid crystal panel having a predetermined shape and size using a dicing apparatus or the like, if necessary. In this regard, in the case where the opposed substrate 1 for a liquid crystal panel is obtained after the process <2> as described above, that is, in the case where the cutting process is not required, this process <3> may not be carried out.

In this way, it is possible to obtain the opposed substrate 1 for a liquid crystal panel as shown in FIG. 1.

In the method of manufacturing the opposed substrate for a liquid crystal panel, the transparent conductive film 12 may be formed on the resin layer 102, for example, without forming the black matrix 11.

Figure 6:
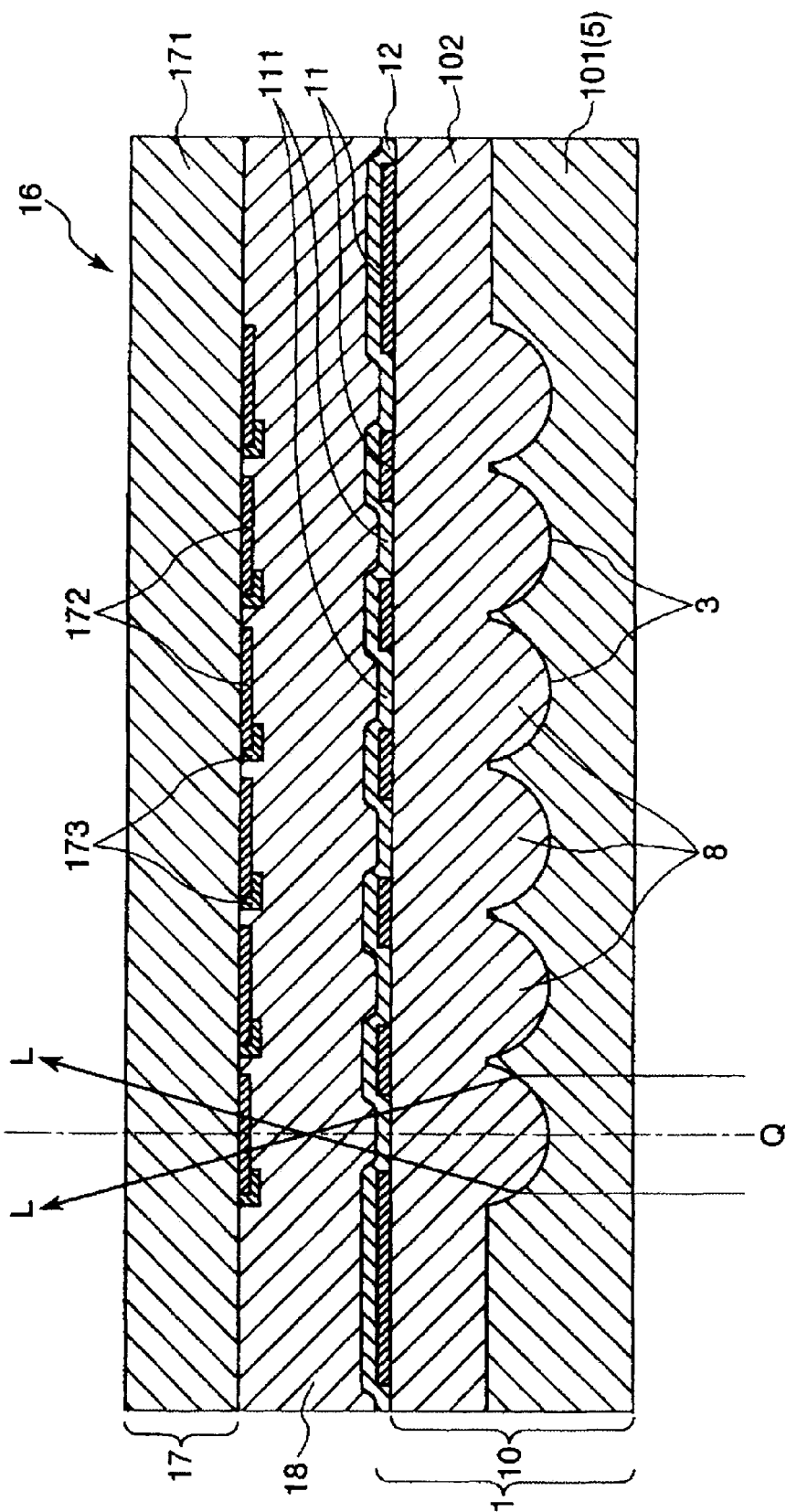
FIG. 6 is a schematic longitudinal cross-sectional view which shows a liquid crystal panel of the invention.

Next, a liquid crystal panel (liquid crystal light shutter) in which the opposed substrate 1 for a liquid crystal panel as shown in FIG. 1 is used will be described with reference to FIG. 6. FIG. 6 is a schematic longitudinal cross-sectional view which shows a liquid crystal panel of the invention.

As shown in FIG. 6, the liquid crystal panel (TFT liquid crystal panel) 16 of the invention is provided with: a TFT substrate (liquid crystal driving substrate) 17; an opposed substrate 1 for a liquid crystal panel which is joined to the TFT substrate 17; a liquid crystal layer 18 consisting of liquid crystal filled or enclosed in a gap between the TFT substrate 17 and the opposed substrate for a liquid crystal panel.

The TFT substrate 17 is a substrate for driving liquid crystal of the liquid crystal layer 18 and includes a glass substrate 171, plural (a large number of) pixel electrodes 172 provided on the glass substrate 171, and plural (a large number of) thin film transistors (TFT) 173 provided in the vicinity of the respective pixel electrodes 172 and corresponding to the respective pixel electrodes 172.

In the liquid crystal panel 16, the TFT substrate 17 is joined to the opposed substrate 1 for a liquid crystal panel in a manner spaced with a constant interval so that the transparent conductive film (common electrode) 12 of the opposed substrate 1 for a liquid crystal panel faces the large number of pixel electrodes 172 of the TFT substrate 17.

It is preferable that the glass substrate 171 is formed of quartz glass. This makes it possible to obtain a liquid crystal panel (TFT substrate) that is less likely to be warped or bent and has excellent stability.

The pixel electrodes 172 perform charging and discharging between the transparent conductive film (the common electrode) 12 and the pixel electrodes 172 to thereby drive the liquid crystal of the liquid crystal layer 18. The pixel electrodes 172 are formed of, for example, a material same as the material of the transparent conductive film 12.

The thin film transistors 173 are connected to the pixel electrodes 172 corresponding to and provided near the thin film transistors 173. The thin film transistors 173 are connected to a control circuit (not shown in the drawings) and controls an electric current supplied to the pixel electrodes 172. As a result, charging and discharging of the pixel electrodes 172 are controlled.

The liquid crystal layer 18 contains liquid crystal molecules (not shown in the drawings). Orientation of the liquid crystal molecules, that is, liquid crystal, changes in response to charging and discharging of the pixel electrodes 172.

In such a liquid crystal panel 16, usually, one microlens 8, one opening 111 of the black matrix 11 corresponding to an optical axis Q of the microlens 8, one pixel electrode 172, and one thin film transistor 173 connected to the pixel electrode 172 correspond to one pixel.

Incident light L entering from the side of the substrate 101 with concave portions passes through the glass substrate 5 and permeates through the resin layer 102, the openings 111 of the black matrix 11, the transparent conductive film 12, the liquid crystal layer 18, the pixel electrodes 172, and the glass substrate 171 while being condensed when the incident light L passes through the microlenses 8. At this point, since a polarizing plate (not shown in the drawings) is usually provided on the incidence side of the substrate 101 with concave portions, the incident light L changes to linear polarized light when the incident light L is transmitted through the liquid crystal layer 18. In that case, a polarizing direction of the incident light L is controlled in association with an orientation state of the liquid crystal molecules of the liquid crystal layer 18. Therefore, it is possible to control luminance of emitted light by transmitting the incident light L, which is transmitted through the liquid crystal panel 16, through the polarizing plate (not shown in the drawings).

In this regard, the polarizing plate is constituted from, for example, a base substrate and a polarizing base material substrate laminated on the base substrate. The polarizing base material substrate is formed of a resin material in which a polarizing element (such as iodine complex, dichromatic dye) is added.

It is possible to manufacture the liquid crystal panel 16 by subjecting the TFT substrate 17 and the opposed substrate for a liquid crystal panel, which are respectively manufactured by any known method, to a orientation process, and then, joining the TFT substrate 17 to the opposed substrate 1 for liquid crystal panel via a seal material (not shown in the drawings), injecting liquid crystal into a gap portion formed by the joining of the TFT substrate 17 and the opposed substrate 1 for liquid crystal panel from filling holes (not shown in the drawings) of the gap portion, and then closing the filling holes. A polarizing plate may then be applied to either the incident side or the emission side of the liquid crystal panel 16, if needed.

In this case, in the liquid crystal panel 16, the TFT substrate is used as the liquid crystal driving substrate. However, a liquid crystal driving substrate other than the TFT substrate such as a TFD substrate, an STN substrate and the like may be used for the liquid crystal driving substrate.

Hereinafter, a projection type display apparatus using the liquid crystal panel 16 will now be described.

Figure 7:
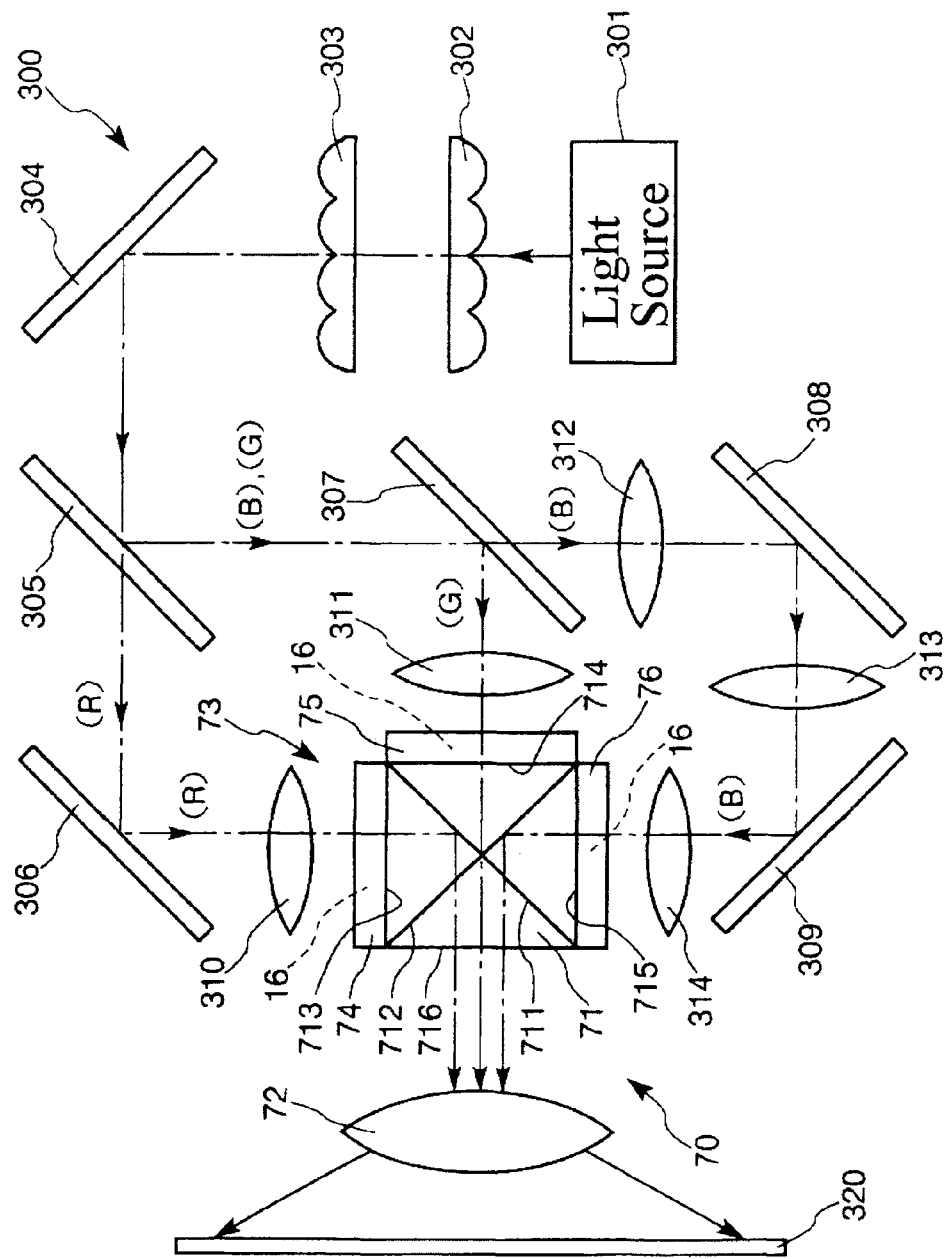
FIG. 7 is a schematic longitudinal cross-sectional view which shows an optical system in a projection type display apparatus of the invention.

FIG. 7 is a schematic longitudinal cross-sectional view which shows an optical system in a projection type display apparatus of the invention.

As shown in FIG. 7, a projection type display apparatus 300 includes: a light source 301; a lighting optical system provided with a plurality of integrator lenses; a color separation optical system (a light guiding optical system) provided with a plurality of dichroic mirrors and the like; a liquid crystal light valve (a liquid crystal light shutter array) (for red) 74 corresponding to a red color; a liquid crystal light valve (a liquid crystal light shutter array) (for green) 75 corresponding to a green color; a liquid crystal light valve (a liquid crystal light shutter array) (for blue) 76 corresponding to a blue color; a dichroic prism (a color combining optical system) 71 on which a dichroic mirror surface 711 for reflecting only red light and a dichroic mirror surface 712 for reflecting only blue light are formed; and a projection lens (a projection optical system) 72.

The lighting optical system includes integrator lenses 302 and 303. The color separating optical system includes mirrors 304, 306, and 309, a dichroic mirror 305 that reflects blue light and green light (transmits only red light), a dichroic mirror 307 that reflects only green light, a dichroic mirror 308 that reflects only blue light (or a mirror that reflects blue light), and condensing lenses 310, 311, 312, 313, and 314.

The liquid crystal light valve 75 includes: the liquid crystal panel 16 as described above; a first polarizing plate (not shown in the drawings) joined to the incident surface side of the liquid crystal panel 16 (the side of the liquid crystal panel 16 at which the substrate 101 with concave portions is positioned, that is, the side thereof opposite to the dichroic prism 71); and a second polarizing plate (not shown in the drawings) joined to the emission surface side the liquid crystal panel 16 (the side of the liquid crystal panel 16 which faces the substrate 101 with concave portions, that is, the side of the dichroic prism 71). The liquid crystal light valves 74 and 76 have the same structure as the liquid crystal light valve 75. The liquid crystal panels 16 included in the liquid crystal light valves 74, 75 and 76 are respectively connected to a driving circuit (not shown in the drawings).

In the projection type display apparatus 300, the dichroic prism 71 and the projection lens 72 constitute an optical block 70. Further, the optical block 70 and the liquid crystal light valves 74, 75 and 76 fixedly provided on the dichroic prism 71 constitute a display unit 73.

Hereinafter, operations of the projection type display apparatus 300 will be explained.

White light (white light beams) emitted from the light source 301 is transmitted through the integrator lenses 302 and 303. Light intensity (luminance distribution) of this white light is uniformalized by the integrator lenses 302 and 302.

The white light transmitted through the integrator lenses 302 and 303 is reflected to the left side in FIG. 7 by the mirror 304. Blue light (B) and green light (G) in the reflected light are reflected to the lower side in FIG. 7 by the dichroic mirror 305 and red light (R) in the reflected light is transmitted through the dichroic mirror 305.

The red light transmitted through the dichroic mirror 305 is reflected to the lower side in FIG. 7 by the mirror 306. The reflected light is shaped by the condensing lens 310 to be made incident on the liquid crystal light valve for red 74.

The green light in both the blue light and the green light reflected by the dichroic mirror 305 is reflected to the left side in FIG. 7 by the dichroic mirror 307, while the blue light is transmitted through the dichroic mirror 307.

The green light reflected by the dichroic mirror 307 is shaped by the condensing lens 311 and made incident on the liquid crystal light valve for green 75.

The blue light transmitted through the dichroic mirror 307 is reflected to the left side in FIG. 7 by the dichroic mirror (or the mirror) 308. The reflected light is further reflected to the upper side in FIG. 7 by the mirror 309. The blue light is shaped by the condensing lenses 312, 313, and 314 and made incident on the liquid crystal light valve for blue 76.

In this way, the white light emitted from the light source 301 is separated into three primary colors of red, green, and blue, guided to the liquid crystal light valves 74, 75, 76 corresponding thereto, respectively, and made incident thereon.

In this case, respective pixels (the thin film transistors 173 and the pixel electrodes 172 connected thereto) of the liquid crystal panel 16 included in the liquid light valve 74 are subjected to switching control (ON/OFF), that is, modulated by a driving circuit (a driving unit) that operates on the basis of an image signal for red.

Similarly, the green light and the blue light are made incident on the liquid crystal light valves 75 and 76, respectively, and modulated by the respective liquid crystal panels 16. Consequently, an image for green and an image for blue are formed. In this case, respective pixels of the liquid crystal panel 16 included in the liquid crystal light valve 75 are subjected to switching control by a driving circuit that operates on the basis of an image signal for green. Further, respective pixels of the liquid crystal panel 16 included in the liquid crystal light valve 76 are also subjected to switching control by a driving circuit that operates on the basis of an image signal for blue.

Consequently, the red light, the green light, and the blue light are modulated by the liquid crystal light valves 74, 75, and 76, respectively, and then, an image for red, an image for green, and an image for blue are formed.

The image for red formed by the liquid crystal light valve 74, that is, the red light from the liquid crystal light valve 74 is made incident on the dichroic prism 71 from a surface 713, reflected to the left side in FIG. 7 on the dichroic mirror surface 711, transmitted through the dichroic mirror surface 712, and then emitted from an emission surface 716.

Further, the image for green formed by the liquid crystal light valve 75, that is, the green light from the liquid crystal light valve 75 is made incident on the dichroic prism 71 from a surface 714, transmitted through the dichroic mirror surfaces 711 and 712, and then emitted from the emission surface 716.

Moreover, the image for blue formed by the liquid crystal light valve 76, that is, the blue light from the liquid crystal light valve 76 is made incident on the dichroic prism 71 from a surface 715, reflected to the left side in FIG. 7 on the dichroic mirror surface 712, transmitted through the dichroic mirror surface 711, and then emitted from the emission surface 716.

In this way, the lights of the respective colors from the liquid crystal light valves 74, 75, and 76, that is, the respective images formed by the liquid crystal light valves 74, 75 and 76 are combined by the dichroic prism 71. Consequently, a color image is formed. This image is projected (magnified and projected) on the screen 320 set in a predetermined position by the projection lens 72.

At this time, since the liquid crystal light valves 74, 75 and 76 are respectively provided with the liquid crystal panels 16, attenuation of the light from the light source 301 is prevented when passing through the liquid crystal light valves 74, 75 and 76, and therefore, it is possible to project a bright image on the screen 320.

As described above, it should be noted that, even though the method of manufacturing a microlens substrate 10, the microlens substrate 10, the opposed substrate 1 for a liquid crystal panel, the liquid crystal panel 16 and the projection type display apparatus 300 according to the invention have been described with reference to the preferred embodiments shown in the accompanying drawings, the invention is not limited to these embodiments.

In the method of manufacturing a microlens substrate according to the invention, for example, one or more step for optional purposes may be added thereto.

Further, the substrate 101 with concave portions constituting the microlens substrate 10 of the invention may be manufactured using any method. For example, the substrate 101 with concave portions may be manufactured using a mold provided with a plurality of convex portions.

Moreover, in the embodiment as described above, even though the method in which the etching process is carried out using the mask has been described, an etching process may be carried out without a mask.

Furthermore, in the embodiment as described above, even though the case where the microlens substrate 10 of the invention is used in the projection type display apparatus 300 provided with the liquid crystal panels 16 and the liquid crystal light valves 74, 75 and 76 has been described as an example, the invention is not limited thereto. It should be noted that the microlens substrate 10 of the invention can be used in, for example, various electro-optic apparatus such as a CCD, an optical communication element, an organic or inorganic EL (electroluminescence) display apparatus, and other apparatus.

Further, in the embodiment as described above, even though the case where the microlens substrate 10 of the invention is applied to the projection type display apparatus has been described, the microlens substrate 10 of the invention may be applied to a transmission screen and a rear projection.

EXAMPLE

Example 1

A substrate with concave portions for microlenses equipped with a plurality of concave portions was manufactured, and then a microlens substrate was manufactured using the substrate with concave portions for microlenses in the following manner.

<Formation Process for Substrate with Concave Portions>

First, a quartz glass substrate (which has an index of refraction of 1.46) having a thickness of 1.2 mm was prepared as a glass substrate.

The quartz glass substrate was soaked in a cleaning liquid (that is, a mixture of 80% sulfuric acid solution and 20% hydrogen peroxide solution) heated to 85° C. to be washed, thereby cleaning its surface.

Next, Cr films each having a thickness of 0.03 μm were formed on the quartz glass substrate by means of a spattering method. Namely, a mask and a rear face protective film formed both of the Cr films were formed on the both major surfaces of the quartz glass substrate.

Figure 2B:
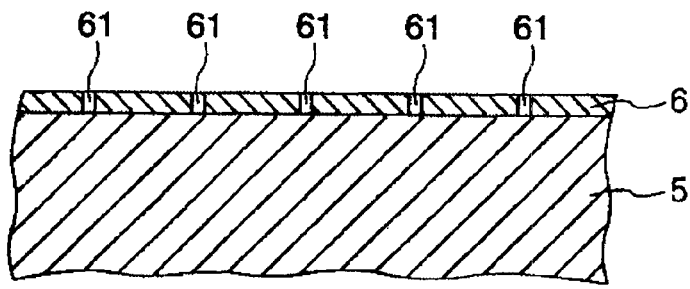
Figure 2C:
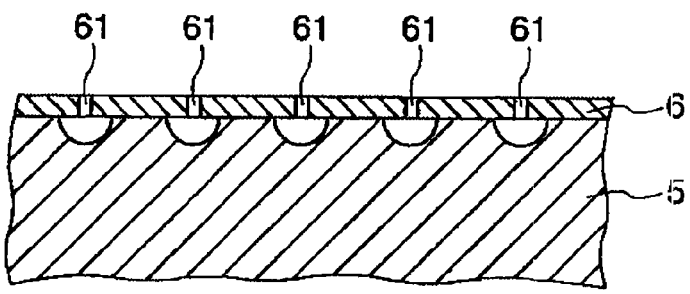

Next, a laser machining was carried out with respect to the mask, whereby a large number of initial holes were formed in the mask (see FIG. 2(b)).

In this regard, the laser machining was carried out using a YAG laser under the conditions of energy intensity of 1 W, a beam diameter of 5 μm, and an irradiation time of $60 \times 10^{-9}$ seconds. The average diameter of each of the formed initial holes was 5 μm.

Figure 2D:
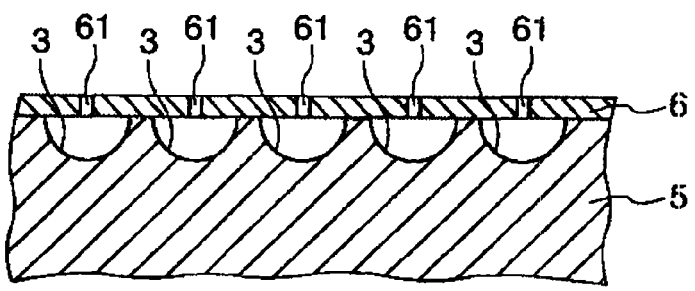
Figure 2E:
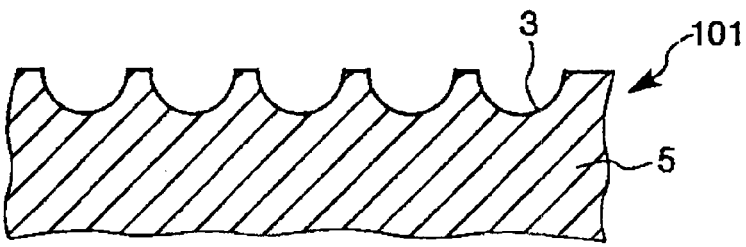

Next, a large number of concave portions were formed on the quartz glass substrate by subjecting the quartz glass substrate to a wet etching process (see FIG. 2(d)).

An etching time for this wet etching process was set to 72 minutes, and a hydrofluoric-based etching liquid was used as an etchant.

Next, the mask and the rear face protective film were removed by subjecting the quartz glass substrate to a dry etching process using CF gas.

In this way, a substrate with concave portions in which a large number of concave portions were regularly formed on the quartz glass substrate was obtained. In this regard, the average diameter of each of the formed concave portions was 15 μm, and a radius of curvature thereof was 7.5 μm. Further, an interval between two adjacent concave portions for microlenses (average distance between the centers of two adjacent concave portions) was 15 μm.

<Adhesion Improving Process>

Next, the major surface of the substrate with concave portions obtained as described above on which the concave portions are formed was subjected to surface treatment using 3-glycidoxypropyltrimethoxysilane as a silane coupling agent (adhesion improving process).

In this case, in the surface treatment, the substrate with concave portions was subjected to a vapor process for about three hours at the atmosphere of 175° C. using 1 cc of 3-glycidoxypropyltrimethoxysilane. Then, the substrate with concave portions was left in a thermo-hygrostat for about one hour at the atmosphere of 80° C. and 70%.

<Pressure-Joining Process>

On the other hand, a resin substrate having a thickness $T_1$ of 0.05 mm and formed of polyester resin (that is, thermosetting resin which has a glass transformation point of 190° C. and an index of refraction of 1.60) was prepared.

The resin substrate was mounted on the substrate with concave portions so as to face one major surface of the substrate with concave portions on which the concave portions were formed (see FIG. 3(a)).

Next, after reducing the ambient pressure to 10 Pa, the substrate with concave portions and the thin glass substrate were heated at 200° C. Then, the resin substrate was brought into contact with the substrate with concave portions (see FIG. 3(b)).

Next, the resin substrate was pressed, whereby the concave portions were filled with the resin material. The resin substrate and the substrate with concave portions were cooled until the temperature of the resin substrate became about Tg, whereby the pressure was released (see FIG. 3(c)).

In this way, a microlens substrate in which the substrate with concave portions was joined to the lens layer was obtained. The average diameter of each of the formed microlenses was 15 μm, and a radius of curvature thereof was 7.5 μm. Further, the thickness $T_2$ from a flat portion of the substrate with concave portions at which the lens layer is joined to the substrate with concave portions to one major surface of the lens layer at which the lens layer is not joined to the substrate with concave portions, that is, the thickness $T_2$ of the portion at which the microlens was not formed in the thin glass substrate (lens layer) was 0.04 mm.

Examples 2 to 5

By adjusting the size of each of initial holes, etching time or the like in the method of manufacturing a substrate with concave portions, the respective substrates of concave portions in which each concave portion had the average diameter and the radius of curvature as shown in TABLE 1 were formed, and the kind of resin material and the thickness thereof as shown in TABLE 1 were used. In this way, microlens substrates were manufactured in a manner similar to that in Example 1 described above except for the above points.

Example 6

A substrate with concave portions for microlenses equipped with a plurality of concave portions was manufactured, and then a microlens substrate was manufactured using the substrate with concave portions for microlenses in the following manner.

<Formation Process for Substrate with Concave Portions>

First, a quartz glass substrate (which has an index of refraction of 1.46) having a thickness of 1.2 mm was prepared as a glass substrate.

The quartz glass substrate was soaked in a cleaning liquid (that is, a mixture of 80% sulfuric acid solution and 20% hydrogen peroxide solution) heated to 85° C. to be washed, thereby cleaning its surface.

Next, Cr films each having a thickness of 0.03 µm were formed on the quartz glass substrate by means of a spattering method. Namely, a mask and a rear face protective film formed both of the Cr films were formed on the both major surfaces of the quartz glass substrate.

Next, a laser machining was carried out with respect to the mask, whereby a large number of initial holes were formed in the mask (see FIG. 2(b)).

In this regard, the laser machining was carried out using a YAG laser under the conditions of energy intensity of 1 W, a beam diameter of 5 µm, and an irradiation time of $60 \times 10^{-9}$ seconds. The average diameter of each of the formed initial holes was 5 µm.

Next, a large number of concave portions were formed on the quartz glass substrate by subjecting the quartz glass substrate to a wet etching process (see FIG. 2(d)).

An etching time for this wet etching process was set to 72 minutes, and a hydrofluoric-based etching liquid was used as an etchant.

Next, the mask and the rear face protective film were removed by subjecting the quartz glass substrate to a dry etching process using CF gas.

In this way, a substrate with concave portions in which a large number of concave portions were regularly formed on the quartz glass substrate was obtained. In this regard, the average diameter of each of the formed concave portions was 15 µm, and a radius of curvature thereof was 7.5 µm. Further, an interval between two adjacent concave portions for microlenses (average distance between the centers of two adjacent concave portions) was 15 µm.

<Adhesion Improving Process>

Next, the major surface of the substrate with concave portions obtained as described above on which the concave portions are formed was subjected to surface treatment using 3-aminopropyl trimethoxysilane (Product name "silane coupling agent KBE-903", made by Shin-Etsu Chemical Co., Ltd.) as a silane coupling agent (adhesion improving process).

In this case, in the surface treatment, the substrate with concave portions was subjected to a vapor process for about three hours at the atmosphere of 175° C. using 1 cc of 3-aminopropyl trimethoxysilane. Then, the substrate with concave portions was left in a thermo-hygrostat for about one hour at the atmosphere of 80° C. and 70%.

<Pressure-Joining Process>

On the other hand, a resin substrate having a thickness $T_1$ of 0.05 mm and formed of phenol resin (that is, thermosetting resin which has a glass transformation point of 190° C., an index of refraction of 1.60 and curing temperature of 180° C.) in a state where all monomers in the phenol resin have not reacted so that the phenol resin is not completely hardened was prepared. In this regard, the content of a solvent which dissolves the monomers constituting the phenol resin in the resin substrate was 10 weight by %.

Figure 4A:
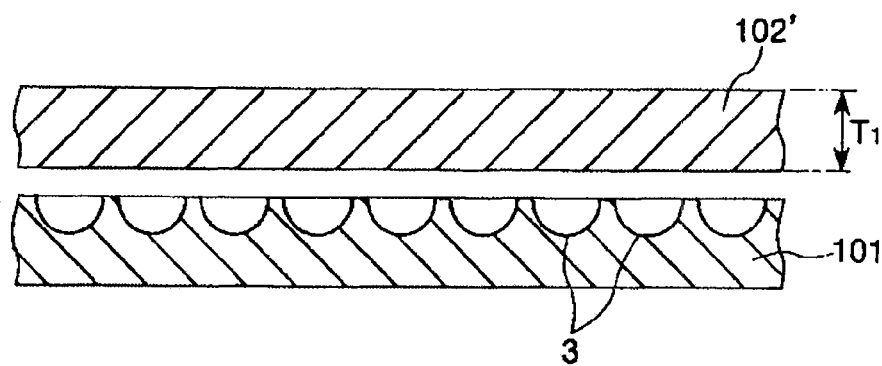
FIG. 4 is a schematic longitudinal cross-sectional view which shows a method of manufacturing the microlens substrate in a second embodiment of the invention.
Figure 4B:
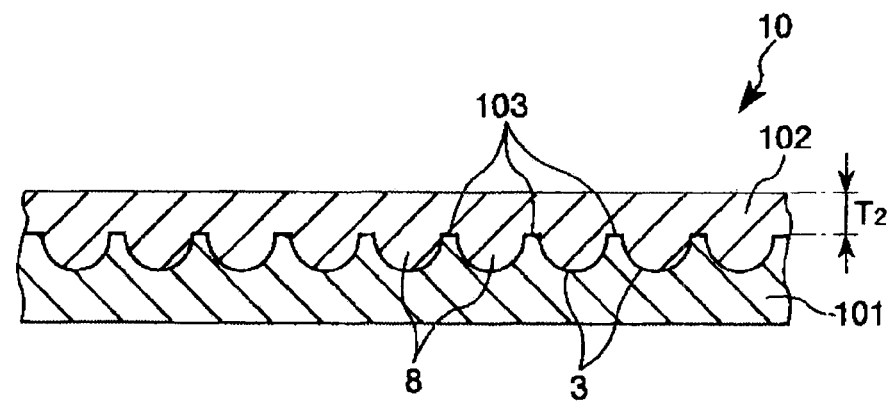

The resin substrate was mounted on the substrate with concave portions so as to face one major surface of the substrate with concave portions on which the concave portions were formed (see FIG. 4(a)).

Next, after reducing the ambient pressure to 10 Pa, the substrate with concave portions and the thin glass substrate were heated at 200° C.

Next, the resin substrate was pressed to the substrate with concave portions, whereby the concave portions were filled with the resin material. The resin material was cured. Then, the resin substrate and the substrate with concave portions were cooled until the temperature of the resin substrate became about 100° C., whereby the pressure was released (see FIG. 4(b)).

In this way, a microlens substrate in which the substrate with concave portions was joined to the lens layer was obtained. The average diameter of each of the formed microlenses was 15 µm, and a radius of curvature thereof was 7.5 µm. Further, the thickness $T_2$ from a flat portion of the substrate with concave portions at which the lens layer is joined to the substrate with concave portions to one major surface of the lens layer at which the lens layer is not joined to the substrate with concave portions, that is, the thickness $T_2$ of the portion at which the microlens was not formed in the thin glass substrate (lens layer) was 0.04 mm.

Examples 7 to 10

By adjusting the size of each of initial holes, etching time or the like in the method of manufacturing a substrate with concave portions, the respective substrates of concave portions in which each concave portion had the average diameter and the radius of curvature as shown in TABLE 1 were formed, and the kind of resin material and the thickness thereof as shown in TABLE 1 were used. In this way, microlens substrates were manufactured in a manner similar to that in Example 6 described above except for the above points.

Comparative Example

A microlens substrate was manufactured using a substrate with concave portions obtained in the same manner as that in Example 1 described above as follows. A non-polymerized (uncured) ultraviolet (UV) cured type epoxy resin material (which has an index of refraction of 1.59) was supplied on the major surface of the substrate with concave portions on which the concave portions were formed.

Next, the UV cured type epoxy resin material was pressed with a cover glass formed of quartz glass. At this time, this process was carried out so that air was not intruded between the cover glass and the UV cured type epoxy resin material.

Next, by irradiating ultraviolet rays of 10,000 mJ/cm$^2$ to the UV cured type epoxy resin material through the cover glass, the UV cured type epoxy resin material was cured to join the cover glass to the substrate with concave portions.

Next, by grinding and polishing the joined cover glass, the thickness of the cover glass was to become 50 µm.

The polished surface of the cover glass was then washed with brush cleaning using a scrub cleaning apparatus.

In this way, a microlens substrate was obtained. In this regard, the average diameter of each of the formed microlenses was 15 µm, and the average radius of curvature thereof was 7.5 µm.

The average diameter, the average radius of curvature and the depth of each of concave portions in the substrate with concave portions; the index of refraction of the glass material of the substrate with concave portions; the kind of resin material constituting the resin substrate; the content of the solvent and the curing temperature $T_3$ of the resin material; the index of refraction and the glass transformation point of the resin material of the resin substrate; the thickness $T_1$ of the resin substrate; the heating temperature; the average diameter and the average radius of curvature of each of the microlenses in the manufactured microlens substrate; the thickness $T_2$ of the lens layer; and $T_2/T_1$ in each of Examples 1 to 10 and Comparative Example were shown in TABLE 1 as a whole.

manufactured, liquid crystal panels as shown in FIG. 5 were respectively manufactured using the opposed substrates for a liquid crystal panel, and projection type display apparatuses as shown in FIG. 6 were respectively manufactured using the liquid crystal panels.

TABLE 1

| | Substrate with Concave Portions | | | | | | | |
|---|---|---|---|---|---|---|---|---|
| | Average Diameter (μm) | Average Radius of Curvature (μm) | Depth (μm) | Index of Refraction | Glass Substrate Resin Material | | | |
| | | | | | Kind of Glass Material | | Content of Solvent | Curing temperature |
| Ex. 1 | 15 | 7.5 | 7.5 | 1.46 | polyester resin | thermoplastic | — | — |
| Ex. 2 | 15 | 7.5 | 7.5 | 1.46 | polyester resin | thermoplastic | — | — |
| Ex. 3 | 20 | 10 | 10 | 1.46 | polyester resin | thermoplastic | — | — |
| Ex. 4 | 20 | 10 | 10 | 1.46 | polyester resin | thermoplastic | — | — |
| Ex. 5 | 15 | 7.5 | 10 | 1.46 | polyester resin | thermoplastic | — | — |
| Ex. 6 | 15 | 7.5 | 7.5 | 1.46 | phenol resin | thermosetting | 10 | 180 |
| Ex. 7 | 15 | 7.5 | 7.5 | 1.46 | epoxy resin | thermosetting | 10 | 150 |
| Ex. 8 | 20 | 10 | 10 | 1.46 | phenol resin | thermosetting | 10 | 180 |
| Ex. 9 | 20 | 10 | 10 | 1.46 | epoxy resin | thermosetting | 10 | 150 |
| Ex. 10 | 15 | 7.5 | 10 | 1.46 | phenol resin | thermosetting | 10 | 180 |
| Co-Ex | 15 | 7.5 | 7.5 | 1.46 | UV-cured epoxy resin | UV cured | — | — |

| | Glass Substrate | | | | Microlens Substrate | | | |
|---|---|---|---|---|---|---|---|---|
| | Thickness of Glass Substrate $T_1$ (mm) | Index of Refraction | Glass Transformation Point (° C.) | Heating Temperature (° C.) | Average Diameter (μm) | Average Radius of Curvature (μm) | Thickness of Lens Layer $T_2$ (mm) | $T_2/T_1$ |
| Ex. 1 | 0.05 | 1.6 | 190 | 200 | 15 | 7.5 | 0.04 | 0.8 |
| Ex. 2 | 0.05 | 1.6 | 190 | 200 | 15 | 7.5 | 0.04 | 0.8 |
| Ex. 3 | 0.06 | 1.6 | 190 | 220 | 20 | 10 | 0.045 | 0.75 |
| Ex. 4 | 0.06 | 1.6 | 190 | 220 | 20 | 10 | 0.045 | 0.75 |
| Ex. 5 | 0.05 | 1.6 | 190 | 200 | 15 | 7.5 | 0.035 | 0.7 |
| Ex. 6 | 0.05 | 1.6 | — | 200 | 15 | 7.5 | 0.04 | 0.8 |
| Ex. 7 | 0.05 | 1.6 | — | 180 | 15 | 7.5 | 0.04 | 0.8 |
| Ex. 8 | 0.05 | 1.6 | — | 200 | 20 | 10 | 0.04 | 0.8 |
| Ex. 9 | 0.05 | 1.6 | — | 180 | 20 | 10 | 0.04 | 0.8 |
| Ex. 10 | 0.05 | 1.6 | — | 200 | 15 | 7.5 | 0.04 | 0.8 |
| Co-Ex | — | — | — | — | 15 | 7.5 | — | — |

(Evaluation)

In Examples 1 to 10, compared with Comparative Example, it is possible to manufacture a microlens substrate easily.

Further, when microlens substrates were continuously manufactured using the method in each of Examples 1 to 10 and Comparative Example, it is possible to manufacture microlens substrates each having stable quality with high productivity in Examples 1 to 10. On the other hand, in Comparative Example, any microlens substrates were manufactured, and therefore, yield ratio of Comparative Example was extremely inferior to yield ratio of Examples 1 and 2.

Using the microlens substrate obtained by Examples 1 to 10 and Comparative Example as described above, opposed substrates for a liquid crystal panel as shown in FIG. 1 were When an image was projected in each of the projection type display apparatuses thus obtained, an projected image having high resolution could be displayed in each of Examples 1 to 10.

What is claimed is:
1. A method of manufacturing a microlens substrate, the microlens substrate being provided with a plurality of microlenses, the method comprising the steps of:
  preparing a concavity substrate, the concavity substrate having first and second major surfaces, the first major surface having a plurality of concave portions formed therein, each of the plurality of concave portions having a shape corresponding to that of each of the plurality of microlenses;
  preparing a base material substrate mainly formed of a thermoplastic resin material, the base material substrate having third and fourth major surfaces, the third major surface being opposite to the fourth major surface, the third major surface facing the first major surface; and subjecting the first major surface of the concavity substrate on which the plurality of concave portions are formed to surface treatment for improving adhesion to the resin material, wherein the surface treatment is a vapor process using 3-glycidoxypropyltrimethoxysilane or 3-aminopropyltrimethoxysilane;

pressure-joining the concavity substrate to the base material substrate in a state that the concavity substrate and the base material substrate are being heated under a pressure of 10 Pa or less while the fourth major surface of the base material substrate is simultaneously being cooled, wherein in the pressure-joining step, the concavity substrate is joined to the base material substrate so that the plurality of concave portions are filled with the resin material of the base material substrate which is melted by the heat.

2. The method as claimed in claim 1, wherein the concavity substrate is formed of a constituent material, and the absolute value of the difference between an index of refraction of the constituent material of the concavity substrate and an index of refraction of the resin material is 0.10 or more.

3. The method as claimed in claim 2, wherein, a thickness of the base material substrate prior to the pressure-joining step is defined as $T_1$ (mm) and a thickness from a flat portion of the concavity substrate at which the base material substrate is joined to the concavity substrate to the fourth major surface of the base material substrate is defined as $T_2$ (mm), then $T_1$ and $T_2$ satisfy the relation: $0.5 \leq T_2/T_1 \leq 0.95$.

4. The method as claimed in claim 3, wherein the pressure-joining step includes heating the base material substrate to a temperature that is higher than a glass transformation point of the resin material.

5. The method as claimed in claim 4, wherein the glass transformation point of the resin material is 100° C. or higher.

6. A method of manufacturing a microlens substrate, the microlens substrate being provided with a plurality of microlenses, the method comprising the steps of:

preparing a concavity substrate, the concavity substrate having first and second major surfaces, the first major surface having a plurality of concave portions formed therein, each of the plurality of concave portions having a shape corresponding to that of each of the plurality of microlenses;

preparing a base material substrate mainly formed of a thermoplastic resin material in a state where all of the monomers constituting the thermoplastic resin material have not reacted so that the thermoplastic resin material is not completely hardened, the base material substrate having third and fourth major surfaces, the third major surface being opposite to the fourth major surface, the third major surface facing the first major surface; and subjecting the first major surface of the concavity substrate on which the plurality of concave portions are formed to surface treatment for improving adhesion to the resin material, wherein the surface treatment is a vapor process using 3-glycidoxypropyltrimethoxysilane or 3-aminopropyltrimethoxysilane; pressure-joining the concavity substrate to the base material substrate in a state that the concavity substrate and the base material substrate are being heated under a pressure of 10 Pa or less while the fourth major surface of the base material substrate is simultaneously being cooled, wherein in the pressure-joining step, the concavity substrate is joined to the base material substrate so that the plurality of concave portions are filled with the resin material of the base material substrate which is melted by the heat.

7. The method as claimed in claim 6, wherein the base material substrate contains a solvent for dissolving the monomers constituting the thermosetting resin material, and the amount of the solvent contained in the base material substrate is in the range of 1 to 30%.

8. The method as claimed in claim 7, wherein in the pressure-joining step the solvent is removed.

* * * * *